Patented May 18, 1954

2,678,905

UNITED STATES PATENT OFFICE 2,678,905

PURIFICATION OF AQUEOUS FORMALDEHYDE SOLUTIONS BY EXTRACTIVE DISTILLATION

Henry K. Dice, Corpus Christi, Tex., assignor to Celanese Corporation of America, New York, N. Y., a corporation of Delaware No Drawing. Application November 17, 1949, Serial No. 127,991

7 Claims. (Cl. 202—39.5)

This invention relates to distillation operations and relates more particularly to an improved method for the purification of aqueous formaldehyde solutions by extractive distillation operations.

An object of this invention is provide an efficient and economical process for the purification of aqueous formaldehyde solutions containing certain undesirable organic compounds as impurities whereby aqueous formaldehyde of a high degree of purity may be obtained.

Other objects of this invention will appear from the following detailed description.

The vapor phase oxidation of aliphatic hydrocarbons such as propane, butane, or mixtures thereof, with air or oxygen yields a complex mixture of products. Formaldehyde is one of the major products formed and is separated from the mixture of reaction gases obtained by absorption in an aqueous quenching medium. The crude aqueous formaldehyde solution thus obtained may be concentrated by a series of suitable distillations followed by an evaporation step. The complex nature of the product mixture initially obtained makes it quite difficult to remove completely all of the higher molecular weight oxygenated compounds from the concentrated formaldehyde solution. Traces of certain compounds remain behind and these compounds, even though present in exceedingly small amounts, give rise to color formation, particularly, when the concentrated formaldehyde is reacted with sulfuric acid. Such a color reaction makes the formaldehyde solution undesirable for many purposes and impairs the commercial value thereof.

I have now found that concentrated aqueous formaldehyde solutions may be entirely freed of color-forming impurities if said aqueous formaldehyde solutions are subjected to an extractive distillation employing an inert, high-boiling, polar, oxygenated organic compound as the extractant. High boiling esters, acetals, alcohols and ethers having a boiling point above about 150° C. are suitable. As examples of organic compounds which I may employ for effecting said extractive distillation there may be mentioned pentaerythritol diformal, ethyleneglycol, dibutyl oxalate, octyl alcohol, dibutyl phthalate and ethylene glycol dipropionate. Optimum results are obtained employing ethylene glycol dipropionate as the extractant in said extractive distillation.

In effecting said extractive distillation, the concentrated formaldehyde solution to be purified is vaporized and passed upward through a distilling column in counter-current flow to the downwardly flowing organic extractant. The purified vapors leaving the top of the distilling column are condensed and any of the extractant which is carried over may then be separated from the condensate by a suitable distillation of the said formaldehyde condensate. The main body of organic extractant, together with the impurities extracted thereby, passed downwardly and is separated out in the reboiler of the extractive distillation column. The extractant may be freed of the impurities removed from the formaldehyde by distillation and the organic extractant purified in this manner may be recycled to the column in which the extractive distillation takes place so as to effect the purification of further impure formaldehyde solution.

The weight ratio of extractant which is employed to the formaldehyde solution fed to the extractive distillation column may vary from a ratio of from about 0.25 to about 2 or more parts by weight of extractant for each part by weight of formaldehyde solution being subjected to said extractive distillation. Higher ratios of extractant may be employed when a product of a critically high degree of purity is desired. Such purity may be measured by determining the ultra-violet optical density of the formaldehyde at a wave length of 280 m$\mu$. The lower the density the greater the purity.

In order further to illustrate my invention but without being limited thereto, the following examples are given:

Example I 1000 parts by weight per minute of an aqueous solution containing 46% by weight of formaldehyde are vaporized and the vapor introduced into the base of a distillation column while 1000 parts by weight per minute of pentaerythritol diformal at a temperature of 100° C. are introduced at the top of the column. The aqueous formaldehyde vapor distillate coming over at the top of the column is condensed and the purified condensate freed of any of the extractant, which may have come over, by a subsequent distillation. The extractant removed at the base of the column is also distilled to remove extracted impurities and is recycled to the top of the extractive distillation column to effect purification of additional impure formaldehyde solution. The aqueous formaldehyde product obtained contains 41.0% by weight of formaldehyde, has a bromine number of 0.35 and, when 4 volumes of sulfuric acid are added to 10 volumes of the purified formaldehyde, the resulting mixture develops little color. When tested for transparency employing a photoelectric colorimeter, the sulfuric acid solution of formaldehyde transmits 88% of the light. A further critical test for purity which may be utilized is the conversion of a sample of the formaldehyde into hexamine by reacting the same with ammonia. The hexamine obtained has a fair odor and is of a satisfactory white color. An increased degree of purification may be attained by employing an increased ratio of extractant. By doubling the ratio of extractant to the aqueous formaldehyde, a purified aqueous formaldehyde containing 42.4% by weight of formaldehyde is obtained having a bromine number of 0.26 and on dilution, as above, with sulfuric acid, a light transmission of 92%. The purified formaldehyde has an ultraviolet optical density measured at a wave length of 280 m$\mu$ of 1.80. When converted into hexamine, the purified formaldehyde yields hexamine having a very good odor and an excellent white color.

*Example II*

1000 parts by weight per minute of an aqueous solution containing 46% by weight of formaldehyde are vaporized and introduced into the base of a distillation column while 2000 parts by weight per minute of octyl alcohol are introduced at the top of the column. The aqueous formaldehyde vapor distillate coming over at the top of the column is condensed and freed of any of the extractant distilling over. The extractant removed at the base of the column is distilled to remove extracted impurities and is recycled to the top of the extractive distillation column to effect purification of additional impure formaldehyde solution. The aqueous formaldehyde product obtained contains 21.8% by weight of formaldehyde, has a bromine number of 0.16 and when 4 volumes of sulfuric acid are added to 10 volumes of the purified formaldehyde the resulting mixture transmits 85% of the light in the transparency test. The optical density of the purified formaldehyde at 280 m$\mu$ is 0.722. On converting a sample of the formaldehyde into hexamine, the hexamine obtained is of satisfactory odor and color.

*Example III*

1000 parts by weight per minute of an aqueous solution containing 46% by weight of formaldehyde are vaporized and introduced into the base of a distillation column while 1000 parts per minute of ethylene glycol dipropionate are introduced at the top of the column. The aqueous formaldehyde vapor distillation coming over at the top of the column is condensed and freed of any of the extractant distilling over. The extractant removed at the base of the column is distilled to remove extracted impurities and is recycled to the top of the extractive distillation column to effect purification of additional impure formaldehyde solution. The aqueous formaldehyde product obtained contains 36.8% by weight of formaldehyde, has a bromine number of 0.26 and when 4 volumes of sulfuric acid are added to 10 volumes of the purified formaldehyde the resulting mixture develops little color, the diluted solution when tested for transparency transmitting 93% of the light. On converting a sample of the formaldehyde into hexamine by reacting the same with ammonia, the hexamine obtained has a characteristic odor and a clear white color. An increased degree of purification is attained by increasing the ratio of extractant to the aqueous formaldehyde. When the extractant ratio is doubled a purified aqueous formaldehyde containing 40.2% by weight of formaldehyde is obtained having a bromine number of 0.18. The ultraviolet optical density of the purified formaldehyde obtained measured at a wave length of 280 m$\mu$ is 0.572, which indicates a very satisfactory degree of purity. When converted into hexamine the purified formaldehyde yields hexamine having a very good odor and an excellent white color. The term "high-boiling" as employed in the claims is to be construed as meaning boiling at a temperature above about 150° C.

It is to be understood that the foregoing detailed description is given merely by way of illustration and that many variations may be made therein without departing from the spirit of my invention.

Having described my invention, what I desire to secure by Letters Patent is:

1. Process for the purification of concentrated aqueous formaldehyde solutions obtained from the vapor phase partial oxidation of aliphatic hydrocarbons to remove therefrom impurities yielding color on reaction with sulfuric acid, which comprises vaporizing said aqueous solution of formaldehyde, passing the vapors upwardly through a column, passing an extractant selected from the group consisting of pentaerythritol diformal, ethylene glycol, dibutyl oxalate, octyl alcohol, dibutyl phthalate, and ethylene glycol dipropionate downwardly through the column, removing extractant containing impurities from the base of the column, and removing from the top of the column formaldehyde vapors having a formaldehyde concentration no higher than the feed stock.

2. Process for the purification of concentrated aqueous formaldehyde solutions obtained from the vapor phase partial oxidation of aliphatic hydrocarbons to remove therefrom impurities yielding color on reaction with sulfuric acid, which comprises vaporizing said aqueous solution of formaldehyde, passing the vapors upwardly through a column, passing from 0.5 to 10 parts by weight for each part by weight of aqueous formaldehyde being purified of an extractant selected from the group consisting of pentaerythritol diformal, ethylene glycol, dibutyl oxalate, octyl alcohol, dibutyl phthalate, and ethylene glycol dipropionate downwardly through the column, removing extractant containing impurities from the base of the column, and removing from the top of the column formaldehyde vapors having a formaldehyde concentration no higher than the feed stock.

3. Process for the purification of aqueous formaldehyde to remove therefrom impurities yielding color on reaction with sulfuric acid, which comprises subjecting said aqueous formaldehyde to an extractive fractional distillation employing as the extractant ½ to 10 parts by weight of pentaerythritol diformal for each part by weight of aqueous formaldehyde being purified.

4. Process for the purification of aqueous formaldehyde to remove therefrom impurities yielding color on reaction with sulfuric acid, which comprises subjecting said aqueous formaldehyde to an extractive fractional distillation employing as the extractant ½ to 10 parts by weight of octyl alcohol for each part by weight of aqueous formaldehyde being purified.

5. Process for the purification of aqueous formaldehyde to remove therefrom impurities yielding color on reaction with sulfuric acid, which comprises subjecting said aqueous formaldehyde to an extractive fractional distillation employing as the extractant ½ to 10 parts by weight of ethylene glycol dipropionate for each part by weight of aqueous formaldehyde being purified.

6. Process for the purification of aqueous formaldehyde to remove therefrom impurities yielding color on reaction with sulfuric acid, which comprises subjecting said aqueous formaldehyde to an extractive fractional distillation employing as the extractant ½ to 10 parts by weight of ethylene glycol for each part by weight of aqueous formaldehyde being purified.

7. Process for the purification of aqueous formaldehyde to remove therefrom impurities yielding color on reaction with sulfuric acid, which comprises subjecting said aqueous formaldehyde to an extractive fractional distillation employing as the extractant ½ to 10 parts by weight of dibutyl phthalate for each part by weight of aqueous formaldehyde being purified.

References Cited in the file of this patent

UNITED STATES PATENTS

| Number | Name | Date |
|---|---|---|
| 2,273,923 | Bludworth | Feb. 24, 1942 |
| 2,361,493 | Patterson | Oct. 31, 1944 |
| 2,452,414 | Wong | Oct. 26, 1948 |
| 2,452,415 | Wong | Oct. 26, 1948 |
| 2,476,391 | Stautzenberger et al. | July 19, 1949 |

OTHER REFERENCES

Chemical Engineering Progress, vol. 44, No. 12, December 1948, pages 927–931, article by Edward G. Scheible.

Robinson and Gilliland: Elements of Fractional Distillation, fourth edition, published 1950 by McGraw-Hill Book Company, New York, New York, pages 289 and 290.